Sept. 27, 1932.   L. B. PARSONS.   1,879,456
WRITING INSTRUMENT
Filed Oct. 17, 1930
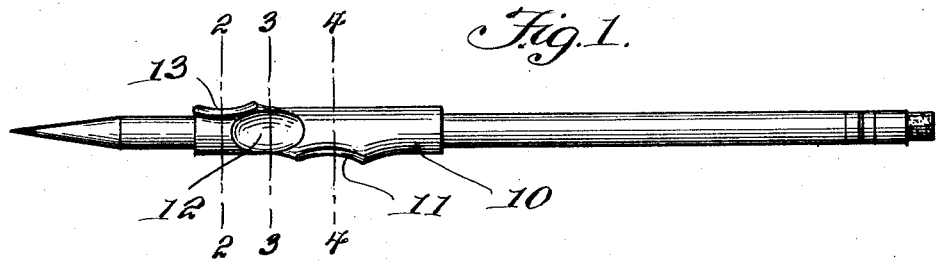
Fig. 1.
  
Fig. 2.   Fig. 3.   Fig. 4.
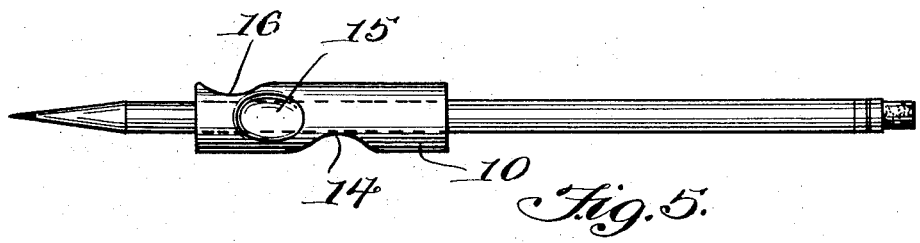
Fig. 5.
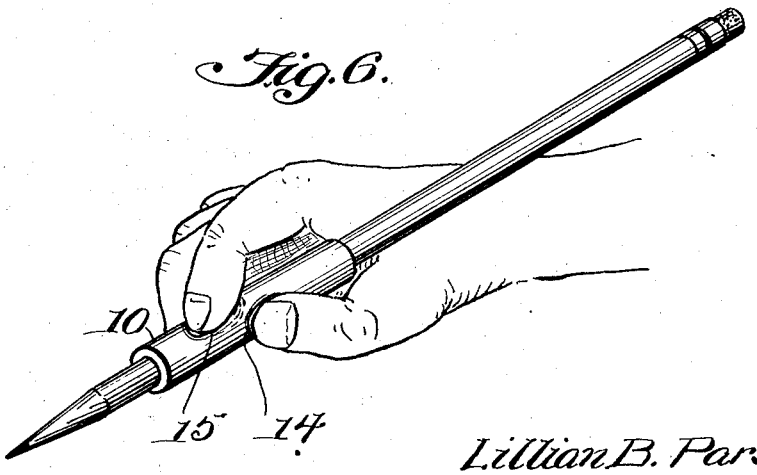
Fig. 6.
Lillian B. Parsons
INVENTOR
BY Victor J. Evans
ATTORNEY Patented Sept. 27, 1932

1,879,456

UNITED STATES PATENT OFFICE

LILLIAN B. PARSONS, OF PICKENS, SOUTH CAROLINA, ASSIGNOR OF ONE-HALF TO JOHN L. VALLEY, OF PICKENS, SOUTH CAROLINA

WRITING INSTRUMENT

Application filed October 17, 1930. Serial No. 489,403.

This invention relates to improvements in writing instruments, such as pens and pencils, an object being to provide an instrument with means to indicate the proper positions of the thumb and fingers when writing, so that the user will naturally grip the instrument properly, the invention being especially designed for use in teaching writing to children, although it may be used advantageously by adults.

An object of the invention is to provide a natural and easy rest for the thumb as well as for the first and second fingers while writing, which will facilitate the gliding of the hand from left to right with a maximum amount of freedom and a minimum amount of effort, second to prevent juveniles from forming incorrect habits in relation to the fingers and thumb in holding a pencil, third to prevent "writer's cramp" by means of keeping the fingers and thumb in position and also to prevent the fingers and thumb from being unduly contracted or bent during the act of writing.

With the above and other objects in view, the invention further includes the following novel features and details of construction, to be hereinafter more fully described, illustrated in the accompanying drawing and pointed out in the appended claim.

In the drawing:—

Figure 1 is an elevation illustrating the invention applied to a pencil.

Figures 2, 3 and 4 are sectional views taken respectively on the lines 2—2, 3—3 and 4—4 of Figure 1.

Figure 5 is an elevation showing a slightly different form of the invention.

Figure 6 is a view illustrating the use of the invention.

Referring to the drawing in detail wherein like characters of reference denote corresponding parts, the invention is illustrated as applied to a pencil, although it is equally well adapted for use with a pen. The invention comprises a sleeve 10 which may be made of metal, wood, cork or any composition and is provided with a bore whose diameter is such that it will frictionally engage the pencil or other instrument to which it is applied. The outer periphery of the sleeve is provided with a depression 11 which forms a seat for the end of the thumb, while depressions 12 and 13 provide seats for the index and second fingers respectively. These depressions are so located that the user will hold the pencil in a natural and proper writing position, and is especially useful in teaching children to write in that the child will, due to the positions of the depressions, find the proper writing position the most comfortable manner to hold the pencil.

In Figure 1 the sleeve is relatively thin and the depressions are formed by building up portions of the sleeve, while in Figure 5, the sleeve is thickened and the depressions 14, 15 and 16, for the thumb, index finger and second finger respectively are formed within the sleeve.

It will be apparent from the foregoing description and accompanying drawing that the invention provides means which may be formed integral with or attached to a pen or pencil for the purpose of teaching the proper writing position. By having the device removably attached, it may be slid along the pencil to provide for sharpening, and may be removed and used with other pencils. It may be desirable, in the manufacture of pens to make the device integral or to form the depressions or seats directly in the penholder.

Each sleeve is provided with a group of depressions adapted to receive the tips of the thumb, first and second fingers, respectively, and the group of depressions is located in the vicinity of one end of the sleeve while the other end of the sleeve is carried back and forms a shoulder adapted to bear against the edge of the palm of the writer at the basis of the thumb and first finger. Therefore, this outstanding edge serves as means for preventing the thumb and fingers from being unduly bent or arched and the muscles of the digits are held properly relaxed longitudinally.

Having described the invention what is claimed is:—

A finger rest for a writing instrument comprising a sleeve having a group of depressions therein, said depressions adapted to receive the tips of the thumb and first and second fingers respectively, the opposite end portion of the sleeve being extended away from the group of depressions and forming an outstanding abutting edge adapted to bear against the edge of the palm of the user at the basis of the thumb and first finger.

In testimony whereof I affix my signature.

LILLIAN B. PARSONS.